Patented Dec. 27, 1949

2,492,706

UNITED STATES PATENT OFFICE 2,492,706

PROCESS FOR INHIBITING POLYMERIZATION OF SULFUR TRIOXIDE IN LIQUID STATE OR OLEUM

Harold G. McCann, Deer Park, N. Y., and Robert V. Townend, Arlington, N. J., assignors to Allied Chemical & Dye Corporation, New York, N. Y., a corporation of New York No Drawing. Application September 24, 1948, Serial No. 51,128

10 Claims. (Cl. 23—174)

This invention relates to the stabilization of liquid sulfur trioxide (substantially pure $SO_3$) and high strength oleums.

At room temperature, liquid sulfur trioxide polymerizes to various degrees. The three generally recognized $SO_3$ modifications melt at approximately 17° C., 32.5° C., and 62° C., respectively. On standing at temperature below about 27° C., in the presence of even small amounts of moisture, the form melting at about 17° C. rapidly polymerizes to the higher melting forms, the mass soon becomes solid, and melts only under pressure, sometimes requiring temperatures up to 100° C. to effect complete liquefaction. High strength oleums of free $SO_3$ strengths upward of about 80% tend to polymerize in similar fashion, degree of polymerization depending chiefly upon the $SO_3$ strength of the oleum and temperatures at which the material is stored. In oleums of the lower portions of the $SO_3$ strength range indicated, certain polymers form, the degree of polymerization increases on passage of time, and while the material may not solidify completely, the ultimate mass may be a liquid phase containing in suspension the various solid polymers noted.

In many industrial processes, it is highly desirable to use $SO_3$ in its strongest obtainable form. However, the foregoing characteristics of sulfur trioxide and high strength oleums create marked disadvantage relative to the storage, shipment and use of such materials. While, for example, sulfur trioxide might be shipped in drums equipped with heating coils, there is involved the first problem of supplying a relatively expensive form of container. Moreover, since heat transfer thru a solid material is poor, the solidified sulfur trioxide in the container can be melted by the user only with considerable difficulty. In addition to this disadvantage, after relatively long periods of standing, a large proportion of the sulfur trioxide will have polymerized to the high melting form in which case complete melting can only be effected by heating at high temperature under considerable pressure. To a lesser extent the same disadvantages apply to high strength oleums.

This invention aims to provide stabilized forms of liquid sulfur trioxide or high strength oleums which either do not polymerize to any substantial degree and remain liquid at room temperature, or in which, if polymerization does take place, the polymers formed are readily meltable at moderate temperatures of about 40° C. and below, i. e. temperatures which do not require substantial vaporization of $SO_3$ or use of heating containers capable of withstanding relatively high pressures, as is the case when high temperatures are needed to melt the more refractory types of polymers. The invention also affords methods for accomplishing the foregoing objectives. A further object of the invention is to provide stabilizing agents which are effective in small concentrations in inhibiting polymerization of $SO_3$, are easily dispersed in liquid sulfur trioxide and high strength oleums, and which, in addition, are not charred nor appreciably decomposed thereby.

According to our invention, it has been found that the incorporation of relatively small amounts of the boron compounds methyl borate, or boron trifluoride-dimethyl etherate or mixtures of these materials, with substantially anhydrous sulfur trioxide or oleums of $SO_3$ strength such that $SO_3$ polymers tend to form, effects the stabilization above described. The invention further comprises the discovery of stabilizing agents, i. e. those indicated, which possess inherent properties such that the stabilizing objectives of the invention are effected by the mere addition of the agents to the material to be stabilized, such properties affording the important advantage that no further processing of the mixed material and stabilizing agent is necessary.

As stated above, oleums of $SO_3$ strength of about 80% and upward tend to polymerize to greater or less extent, depending mostly upon $SO_3$ strength and time and temperature of storage. It has been found that by dispersing our soluble organic boron compounds in liquid sulfur trioxide or in high strength oleums of the type indicated, polymerization is inhibited or minimized. Since anhydrous sulfur trioxide tends to polymerize to a lesser degree than does sulfur trioxide containing water (i. e., chemically combined in the form of $H_2SO_4$), and since, from a commercial point of view, it is advantageous to manufacture, store and ship sulfur trioxide as such (in substantially anhydrous form) or as an oleum containing not less than 99.5% free $SO_3$, particular embodiments of our invention are directed to stabilization of these high $SO_3$ content materials.

When boron trifluoride-dimethyl etherate is employed as inhibitor for sulfur trioxide in the manner herein described, substantially completely stabilized materials may be obtained. Accordingly, the etherate is the preferred polymerization inhibitor. When methyl borate is utilized as stabilizing agent, amounts of polymer formed may be somewhat greater than in the case of the etherate inhibitor. Further, any such polymer formed in our procedure may be melted by heating the sulfur trioxide or oleum to temperature below about 40° C. For many purposes in commerce, this type of stabilization is satisfactory.

The quantity of treating agent employed depends largely upon the degree of stabilization desired and the amount of water present in the material. In general, the larger the amount of agent added, the greater is the stabilizing effect thereof; and, considering anhydrous sulfur trioxide (containing substantially no water) as a starting point, the greater the amount of water, the greater is the tendency for $SO_3$ polymers to form, and the greater will be the amount of stabilizer required to effect a given degree of stabilization. For substantially anhydrous sulfur trioxide adequate stabilization may be obtained by employing either treating agent or mixtures thereof in amount equivalent to about 0.01% by weight of boron or greater. By using etherate inhibitor in amounts equivalent to at least 0.03% by weight of boron, anhydrous sulfur trioxide may be rendered substantially completely stable, i. e. material may be stored indefinitely with no substantial polymerization.

When stabilizing oleums of $SO_3$ strength below 100% but equal to or greater than 99.5%, since the combined water present enhances the tendency of polymer formation, inhibitor concentrations equivalent to 0.03% by weight of boron or greater are preferred. Such stabilized materials do not polymerize to any appreciable extent (i. e., less than 1-2%) and remain substantailly in liquid form when brought to room temperature even though previously stored for several weeks at temperature of zero degrees C. or less. As indicated above, any such polymer formed is readily reconverted to monomeric $SO_3$ by warming to 40° C. or below. Hence, products of this type are completely acceptable in nearly all commercial applications. When stabilizing sulfur trioxide or oleums of higher $SO_3$ strengths, it is preferable to employ substantially anhydrous agents in order to maintain low water content of the end product. It is usually desirable to avoid dilution of the sulfur trioxide and to maintain $SO_3$ strength at the maximum value possible. Therefore it is preferred to utilize treating material in amount equivalent to not more than 0.6% by weight of boron, the latter quantity being generally appreciably more than adequate to effect stabilization of sulfur trioxide or high strength oleums when the sought-for product is such that if the product contains polymers such polymers are readily meltable at temperature below about 40° C. Moreover, we find that over-all results are not significantly better when the stabilizing agents of the invention are used in quantities much in excess of the equivalent to 0.6% by weight of boron.

The preferred products of the invention, i. e., the inhibited sulfur trioxide or oleums of $SO_3$ strength not less than 99.5% which do not polymerize to any appreciable extent preferably should be kept sealed off from contact with air, since a small amount of moisture causes such products to lose some stability and to form these low melting polymers.

The sulfur trioxide or oleum to be treated may be obtained from any suitable source. For example, substantially 100% $SO_3$ may be obtained by distilling say 30% oleum under conditions to avoid vaporization of $H_2SO_4$, and condensing the $SO_3$ at temperature, say 20-30° C., at which liquid sulfur trioxide has sufficiently low vapor pressure. Similarly, liquid sulfur trioxide may be obtained from the dry mist-free, say 10%, $SO_3$ exiting a catalytic $SO_2$ oxidation operation, by compressing the gas to about 160-170 lbs. per square inch, and cooling the compressed gas to 20-25° C., under which conditions about 70% of the $SO_3$ may be liquefied and recovered as substantially 100% liquid sulfur trioxide.

While we do not intend to limit ourselves to any particular theory, we believe that the organic stabilizing agents of this invention dissolve in the oleum or sulfur trioxide, thereby forming solutions of organic boron compound in the material stabilized. This solubility of our organic agents accounts for the ease of incorporation and dispersion of inhibitor in the oleum or sulfur trioxide, and affords the marked advantage of the present invention in that no further processing of the mixed $SO_3$ material and stabilizing agent is required.

The treating agent used may be added directly to the liquid to be stabilized and dissolved by agitation, or in the case of stabilizing substantially 100° sulfur trioxide, the vaporous $SO_3$ conveniently may be condensed in a closed vessel in which the treating material to be used has been previously placed.

The following examples illustrate the practice of our invention, the parts being by weight:

Example 1.—Boron trifluoride-dimethyl etherate in amount equivalent to about 0.05% by weight of boron was added to anhydrous sulfur trioxide and the mixture mildly agitated at substantially room temperature. The resulting mixture was stored for one month at about minus 40° to minus 60° C., and at the end of this time was brought to room temperature. The sulfur trioxide was completely unpolymerized, i. e. contained no unmelted solid.

Example 2.—Methyl borate in amount equivalent to 0.06% by weight of boron was added to anhydrous sulfur trioxide and the mixture mildly agitated at about room temperature. The resulting mixture was then stored at about 0° C. for two weeks, after which time it was warmed to room temperature. No unmelted solid remained in the material. Storage at 0° C. was continued for a total of two months. At the end of this time the material melted to a liquid containing about 1% solids which could readily be transferred from the container by pumping. These solids were melted (i. e., depolymerized) by maintaining the material at about 40° C. for a short period of time.

Example 3.—Boron trifluoride-dimethyl etherate in amount equivalent to about 0.10% by weight of boron was mixed with sulfur trioxide. The water content (chemically combined) of the resulting mixture was 0.035% (approximately 99.8% $SO_3$) based on $H_2SO_4$ plus $SO_3$. This boron treated oleum was stored at zero to minus 60° C. for one month and then warmed to room temperature. About 1% solid material remained unmelted.

Example 4.—Methyl borate in amount equivalent to about 0.02% by weight of boron was added to anhydrous sulfur trioxide and the mixture mildly agitated at about room temperature. The resulting mixture was then stored at about 0° C. for two weeks, after which time it was warmed to room temperature. A trace of unmelted solid remained in the material. Storage at 0° C. was continued for a total of two months. At the end of this time the material melted to a liquid containing less than 5% solids which could readily be transferred from the container by pumping. These solids were melted (i. e., depolymerized) by maintaining the material at about 40° C. for a short period of time.

We claim:

1. The method of stabilizing material of the group consisting of sulfur trioxide and oleum of $SO_3$ strength such that $SO_3$ polymers tend to form, which method comprises incorporating with said material organic boron compound, of the group consisting of methyl borate, boron trifluoride-dimethyl etherate and mixtures thereof, in amount sufficient to stabilize said material.

2. The method of stabilizing material of the group consisting of sulfur trioxide and oleum of $SO_3$ strength such that $SO_3$ polymers tend to form, which method comprises incorporating with said material organic boron compound, of the group consisting of methyl borate, boron trifluoride-dimethyl etherate and mixtures thereof, in amount sufficient to stabilize said material but in amount equivalent to not more than 0.6% by weight of boron.

3. The method of stabilizing material of the group consisting of sulfur trioxide and oleum of $SO_3$ strength not less than 99.5% which method comprises incorporating with said material organic boron compound, of the group consisting of methyl borate, boron trifluoride-dimethyl etherate and mixtures thereof, in amount sufficient to stabilize said material.

4. The method of stabilizing material of the group consisting of sulfur trioxide and oleum of $SO_3$ strength not less than 99.5%, which method comprises incorporating with said material organic boron compound, of the group consisting of methyl borate, boron trifluoride-dimethyl etherate and mixtures thereof, in amount equivalent to 0.03 to 0.6% by weight of boron.

5. The method of stabilizing material of the group consisting of sulfur trioxide and oleum of $SO_3$ strength not less than 99.5%, which method comprises incorporating with said material substantially anhydrous boron trifluoride-dimethyl etherate in amount sufficient to stabilize said material.

6. The method of stabilizing substantially anhydrous sulfur trioxide which comprises incorporating with said sulfur trioxide substantially anhydrous boron trifluoride-dimethyl etherate in amount equivalent to 0.01 to 0.6% by weight of boron.

7. A stable composition resistant to polymerization comprising material of the group consisting of sulfur trioxide and oleum of $SO_3$ strength such that $SO_3$ polymers tend to form, and containing a relatively small amount of boron derived from an incorporated organic substance of the group consisting of methyl borate, boron trifluoride-dimethyl etherate and mixtures thereof.

8. The composition comprising material of the group consisting of sulfur trioxide and oleum of $SO_3$ strength not less than 99.5% and containing boron compound derived from incorporated organic substance of the group consisting of anhydrous methyl borate, anhydrous boron trifluoride-dimethyl etherate and mixture thereof, the amount of said compound being equivalent to 0.03 to 0.6% by weight of boron.

9. A composition comprising material of the group consisting of sulfur trioxide and oleum of $SO_3$ strength not less than 99.5%, and containing boron compound derived from incorporated anhydrous boron trifluoride-dimethyl etherate, the amount of said compound being sufficient to stabilize said material.

10. A composition comprising substantially anhydrous sulfur trioxide containing a boron compound derived from incorporated anhydrous boron trifluoride-dimethyl etherate, the amount of said compound being equivalent to 0.01 to 0.6% by weight of boron.

HAROLD G. McCANN.
ROBERT V. TOWNEND.

No references cited.